(12) United States Patent
Griffin, Jr.

(10) Patent No.: US 8,712,802 B1
(45) Date of Patent: Apr. 29, 2014

(54) TRANSFERRING A DOCUMENT

(75) Inventor: Donald H. Griffin, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1353 days.

(21) Appl. No.: 11/868,818

(22) Filed: Oct. 8, 2007

(51) Int. Cl.
*G06Q 40/00* (2012.01)
(52) U.S. Cl.
USPC ........................................ 705/4; 705/2; 705/3
(58) Field of Classification Search
USPC ............................. 705/4, 2, 38, 36 R; 283/57
See application file for complete search history.

(56) References Cited

U.S. PATENT DOCUMENTS

| | | | |
|---|---|---|---|
| 6,332,146 B1 | 12/2001 | Jebens et al. | |
| 6,446,051 B1 | 9/2002 | Gupta | |
| 6,591,289 B1 | 7/2003 | Britton | |
| 6,983,381 B2 | 1/2006 | Jerdonek | |
| 7,058,605 B2 | 6/2006 | Gupta | |
| 7,171,468 B2 | 1/2007 | Yeung et al. | |
| 7,181,017 B1 | 2/2007 | Nagel et al. | |
| 7,263,493 B1 * | 8/2007 | Provost et al. | 705/4 |
| 7,278,024 B2 | 10/2007 | Sundararajan et al. | |
| 7,890,761 B1 | 2/2011 | Morris | |
| 7,899,718 B2 | 3/2011 | Howell et al. | |
| 8,121,938 B1 | 2/2012 | Zettner et al. | |
| 8,185,457 B1 | 5/2012 | Bear et al. | |
| 8,200,576 B1 | 6/2012 | Zettner et al. | |
| 2002/0002475 A1 | 1/2002 | Freedman et al. | |
| 2002/0035488 A1 | 3/2002 | Aquila et al. | |
| 2002/0042727 A1 * | 4/2002 | Soramoto et al. | 705/4 |
| 2002/0188559 A1 | 12/2002 | Schultz | |
| 2003/0018578 A1 | 1/2003 | Schultz | |
| 2003/0070098 A1 | 4/2003 | Tokita | |
| 2003/0105759 A1 | 6/2003 | Bess et al. | |
| 2003/0225647 A1 | 12/2003 | Dennes | |
| 2004/0006521 A1 | 1/2004 | Diamant et al. | |
| 2004/0153366 A1 | 8/2004 | Olson et al. | |
| 2005/0091338 A1 | 4/2005 | de la Huerga | |
| 2005/0256806 A1 | 11/2005 | Tien et al. | |
| 2005/0273368 A1 * | 12/2005 | Hutten et al. | 705/4 |
| 2006/0195816 A1 | 8/2006 | Grandcolas et al. | |
| 2006/0227378 A1 | 10/2006 | Mihira | |
| 2006/0288090 A1 | 12/2006 | Kraft | |
| 2006/0294392 A1 | 12/2006 | Veprek et al. | |
| 2007/0005730 A1 | 1/2007 | Torvinen et al. | |
| 2007/0016454 A1 | 1/2007 | Tipirneni | |
| 2007/0179818 A1 * | 8/2007 | Magnus | 705/4 |
| 2008/0276098 A1 | 11/2008 | Florencio et al. | |

OTHER PUBLICATIONS

No author, Kings College London—Novel Approaches to Intrusion and Fraud Detection, www.kcl.ac.uk/schools/pse/dcs/services/compimmunology.html.

* cited by examiner

*Primary Examiner* — Behrang Badii
(74) *Attorney, Agent, or Firm* — Brooks, Cameron & Huebsch, PLLC (57) ABSTRACT

Disclosed are systems and methods to transfer a document. The systems and methods provide techniques to provide a secure system coupled to a network, relate a transaction identifier to a transaction, allow a third party access to the secure system to transfer an electronic copy of the document to the secure system and to associate the electronic copy of the document with the transaction identifier, and receive the electronic document file from the third party on the secure system. The transaction may relate to an insurance or financial transaction.

18 Claims, 10 Drawing Sheets

TRANSFERRING A DOCUMENT

CROSS REFERENCE TO RELATED APPLICATIONS

The present application is related to (1) U.S. Utility application Ser. No. 11,868,755, filed on Oct. 8, 2007, and (2) U.S. Utility application Ser. No. 11,868,790, filed on Oct. 8, 2007, the disclosures which are incorporated herein by reference.

FIELD OF THE DISCLOSURE

Various embodiments of the disclosure pertain to a system and method to transfer a document. More specifically, embodiments of the disclosure pertain to a system and method to allow a third party to upload electronic copies of documents to a products and services provider.

BACKGROUND

Businesses may receive a large number of documents in the ordinary course of business. Typically, the sender of the documents has traditionally had to personally deliver the documents to the business, mail the documents to the business using a postal service, or hire a courier to deliver the documents to the business. Additionally, the business may send a courier to pick-up the documents from the sender. These methods of transferring documents are slow and often rely on the speed of the postal service or the courier. This may significantly delay business processes that rely on the documents.

Accordingly, it is desirable to provide an improved system and method to transfer documents.

SUMMARY

Various embodiments of the present disclosure are directed to systems and methods to transfer a document. The systems and methods provide techniques to provide a secure system coupled to a network, relate a transaction identifier to a transaction, allow a third party access to the secure system to transfer an electronic copy of the document to the secure system and to associate the electronic copy of the document with the transaction identifier, and receive the electronic document file from the third party on the secure system. The transaction may relate to an insurance or financial transaction.

BRIEF DESCRIPTION OF THE DRAWINGS

FIG. 1d is a schematic view illustrating an embodiment of a provider used in the system to transfer a document of FIG. 1a.

DETAILED DESCRIPTION

Figure 1A:
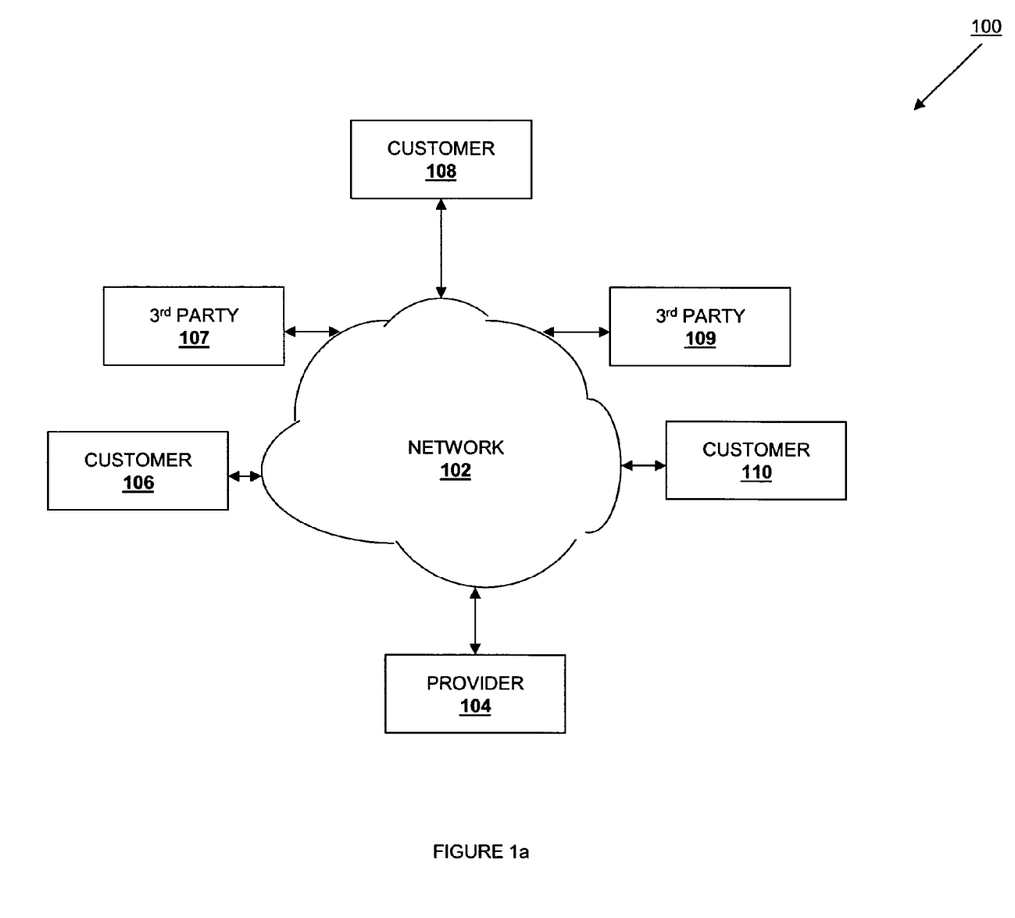
FIG. 1a is a schematic view illustrating an embodiment of a system to transfer a document.

Referring now to FIG. 1a, in one embodiment, a system 100 to transfer a document is illustrated. The system 100 includes a network 102 such as, for example, a Transport Control Protocol/Internet Protocol (TCP/IP) network (e.g., the Internet or an intranet). A provider 104 is operably coupled to the network 102. A plurality of customers 106, 108 and 110 and a plurality of third parties 107 and 109 are also operably coupled to the network 102 in order to allow communication between the customers 106, 108 and 110, the third parties 107 and 109, and the provider 104. In an embodiment, the provider 104 includes a membership organization which provides a plurality of services for its members, such as, for example, banking, insurance, financial services, loans, and/or a variety of other services known in the art, wherein the members include customers 106, 108 and 110. In an embodiment, the provider 104 includes anyone providing insurance services. In an embodiment, the third parties 107 and 109 include anyone associated with the provider 104 and/or the customer 106, 108, and 110 such as, for example, someone supplying information for a transaction relating to the provider 104 and the customer 106, 108, and 110. In an embodiment, the customers 106, 108 and 110 may be, for example, a person acquiring a loan or holding an insurance policy, and/or anyone associated with a person acquiring a loan or holding an insurance policy. In an embodiment, the provider 104 is an insurance company, the customer 106 is the insured by the provider 104, and the third party 107 is a third party to an insurance transaction that results from an insurance event (e.g., an accident) such as, for example, an automobile repair shop.

Each of the provider 104, the customers 106, 108 and 110, and the third parties 107 and 109 includes a respective network interface for communicating with the network 102 (e.g., outputting information to, and receiving information from, the network 102), such as by transferring information (e.g., instructions, data, signals, documents) between such customers 106, 108, and 110, third parties 107 and 109, and the network 102. Accordingly, through the network 102, the provider 104 communicates with the customers 106, 108 and 110 and the third parties 107 and 109, and the customers 106, 108 and 110 and the third parties 107 and 109 communicate with the provider 104.

For clarity, FIG. 1a depicts only one provider 104. However, the system 100 may include a plurality of providers. Likewise, for clarity, FIG. 1a depicts only three customers 106, 108 and 110 and only two third parties 107 and 109. However, the system 100 may include any plurality of customers and third parties. In the discussion below, the customer 106 is a representative one of the customers 106, 108 and 110. In the discussion below, the third party 107 is a representative one of the third parties 107 and 109.

Each of the provider 104, the customers 106, 108 and 110, and the third parties 107 and 109 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHSs are coupled to each other through the network 102. Accordingly, the provider 104, the customers 106, 108 and 110, and the third parties 107 and 109 operate within the network 102.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g., the network 102).

Figure 1B:
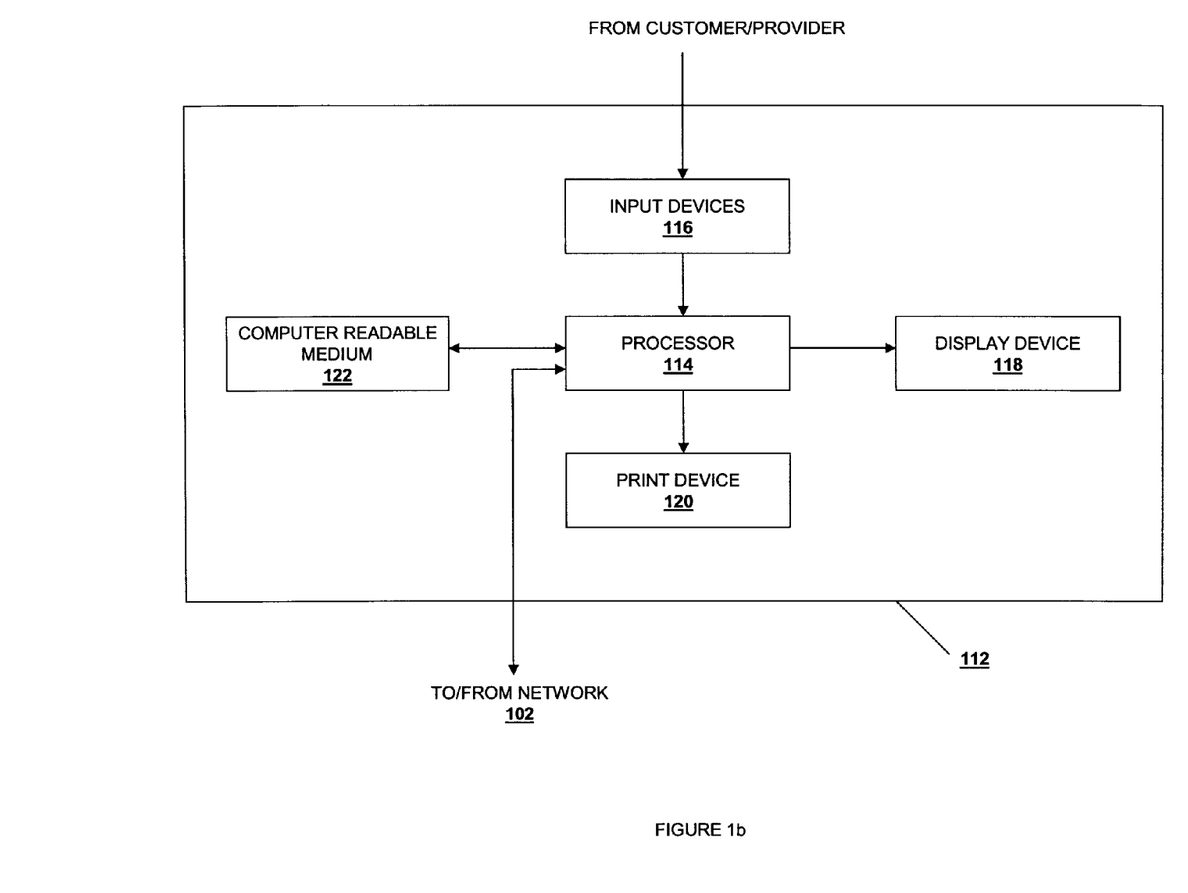
FIG. 1b is a schematic view illustrating an embodiment of an information handling system used with the system to transfer a document.

Referring now to FIG. 1b, an IHS 112 which is representative of one of the IHSs described above, is illustrated. The IHS 112 may include any or all of the following: (a) a processor 114 for executing and otherwise processing instructions, (b) a plurality of input devices 116, which are operably coupled to the processor 114, for inputting information (e.g., a mouse, a keyboard, or a voice recognition system), (c) a display device 118 (e.g., a conventional electronic cathode ray tube (CRT) device, a plasma device, or a conventional liquid crystal display (LCD)), which is operably coupled to the processor 114, for displaying information, (d) a print device 120 (e.g. a conventional electronic printer, scanner or plotter), which is operably coupled to the processor 114, for printing visual images (e.g., textual or graphic information on paper), scanning visual images, and/or faxing visual images, (e) a computer-readable medium 122, which is operably coupled to the processor 114, for storing information, as discussed further below, and (f) various other electronic circuitry for performing other operations of the IHS 112 known in the art.

For example, the IHS 112 may include (a) a network interface (e.g., circuitry) for communicating between the processor 114 and the network 102 and (b) a memory device (e.g., a random access memory (RAM) device or a read-only memory (ROM) device for storing information (e.g., instructions executed by processor 114 and data operated upon by processor 114 in response to such instructions)). Accordingly the processor 114 is operably coupled to the network 102, the input devices 116, the display device 118, the print device 120, and the computer-readable medium 122, as illustrated in FIG. 1b.

For example, in response to signals from the processor 114, the display device 118 displays visual images. Information may be input to the processor 114 from the input devices 116, and the processor 114 may receive such information from the input devices 116. Also, in response to signals from the processor 114, the print device 120 may print visual images on paper, scan visual images, and/or fax visual images.

The input devices 116 include a variety of input devices known in the art such as, for example, a conventional electronic keyboard and a pointing device such as, for example, a conventional electronic mouse, trackball, or light pen. The keyboard may be operated to input alphanumeric text information to the processor 114, and the processor 114 may receive such alphanumeric text information from the keyboard. The pointing device may be operated to input cursor-control information to the processor 114, and the processor 114 may receive such cursor-control information from the pointing device.

The computer-readable medium 122 and the processor 114 are structurally and functionally interrelated with one another as described below in further detail. Each IHS of the illustrative embodiment is structurally and functionally interrelated with a respective computer-readable medium, similar to the manner in which the processor 114 is structurally and functionally interrelated with the computer-readable medium 122. In that regard, the computer-readable medium 122 is a representative one of such computer-readable media including, for example, but not limited to, a hard disk drive.

The computer-readable medium 122 stores (e.g., encodes, records, or embodies) functional descriptive material (e.g., including but not limited to software (also referred to as computer programs or applications) or data structures). Such functional descriptive material imparts functionality when encoded on the computer-readable medium 122. Also, such functional descriptive material is structurally and functionally interrelated to the computer-readable medium 122.

With such functional descriptive material, data structures define structural and functional interrelationships between such data structures and the computer-readable medium 122 (and other aspects of the system 100). Such interrelationships permit the data structures' functionality to be realized. Also, within such functional descriptive material, computer programs define structural and functional interrelationships between such computer programs and the computer-readable medium 122 (and other aspects of the system 100). Such interrelationships permit the computer programs' functionality to be realized.

For example, the processor 114 reads (e.g., accesses or copies) such functional descriptive material from the computer-readable medium 122 onto the memory device of the IHS 112, and the IHS 112 (more particularly, the processor 114) performs its operations, as described elsewhere herein, in response to such material which is stored in the memory device of the IHS 112. More particularly, the processor 114 performs the operation of processing a computer application (that is stored, encoded, recorded, or embodied on a computer-readable medium) for causing the processor 114 to perform additional operations, as described elsewhere herein. Accordingly, such functional descriptive material exhibits a functional interrelationship with the way in which processor 114 executes its processes and performs its operations.

Further, the computer-readable medium 122 is an apparatus from which the computer application is accessible by the processor 114, and the computer application is processable by the processor 114 for causing the processor 114 to perform such additional operations. In addition to reading such functional descriptive material from the computer-readable medium 122, the processor 114 is capable of reading such functional descriptive material from (or through) the network 102 which is also a computer-readable medium (or apparatus). Moreover, the memory device of the IHS 112 is itself a computer-readable medium (or apparatus).

Figure 1C:
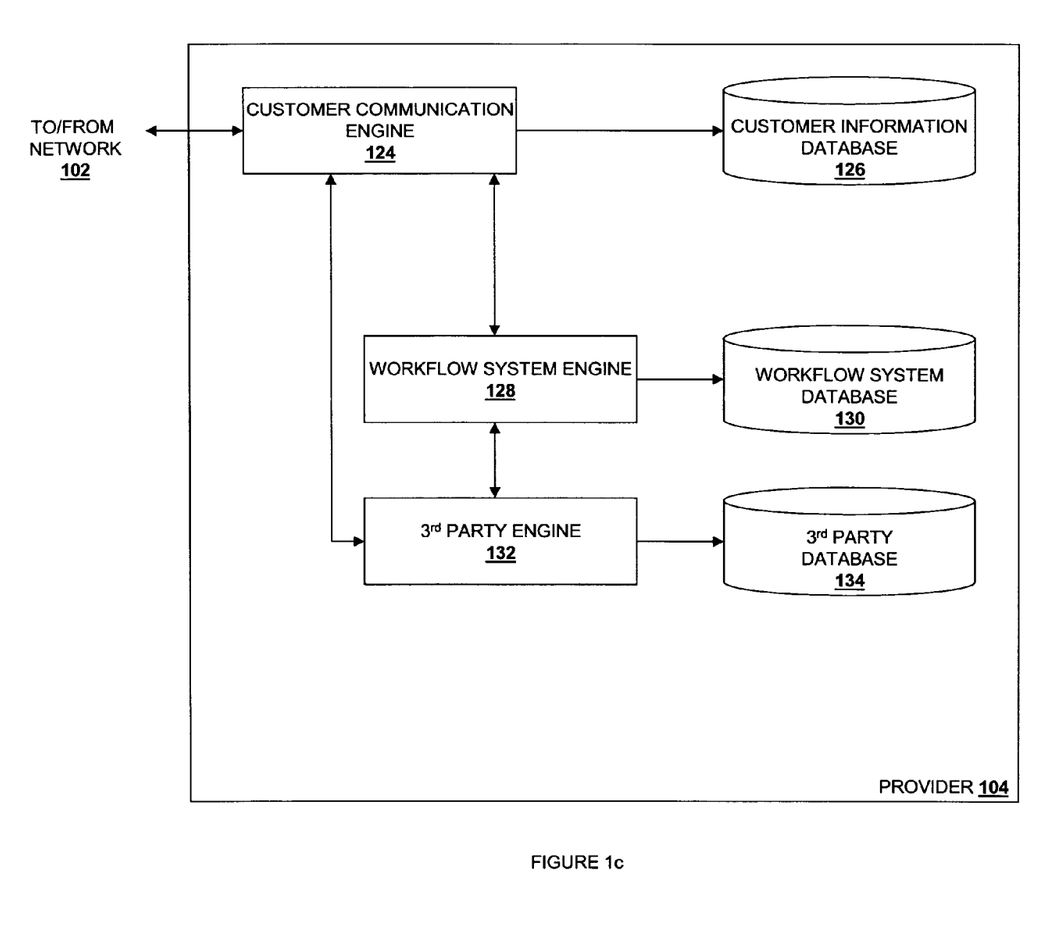
FIG. 1c is a schematic view illustrating an embodiment of a provider used in the system to transfer a document.

Referring now to FIGS. 1a, 1b and 1c, the provider 104 is illustrated in more detail. A customer communication engine 124 which may be, for example, software stored on the computer-readable medium 122 in the IHS 112, is included in the provider 104 and is operably coupled to a customer information database 126 and to the network 102. A workflow system engine 128 which may be, for example, software stored on the computer-readable medium 122 in the IHS 112 is included in the provider 104 and is operably coupled to the customer communication engine 124, to a workflow system database 130, and to the network 102, described above with reference to FIG. 1a. A third party engine 132 which may be, for example, software stored on the computer-readable medium 122 in the IHS 112 is included in the provider 104 and is operably coupled to the customer communication engine 124, the workflow system engine 128, a third party database 134, and to the network 102, described above with reference to FIG. 1a. In an embodiment, the customer information database 126, the workflow system database 130, and the third party database 134 are conventional databases known in the art. In an embodiment, the customer information database 126, the workflow system database 130, and the third party database 134 may be located outside the provider 104 and may still be operably coupled to the provider 104 and the engines 124, 128 and 132 through, for example, the network 102.

In an embodiment, the customer information database 126, the workflow system database 130, and the third party database 134 each include a plurality of databases. In an embodiment, the provider 104 is a membership organization and the customer information database 126 includes a variety of previously collected information about members of the membership organization. In an embodiment, the customer information database 126, the workflow system database 130, and the third party database 134 are publicly-available databases. In an embodiment, the customer information database 126, the workflow system database 130, and the third party database 134 are private database which are available to be accessed by the provider 104.

Figure 1D:
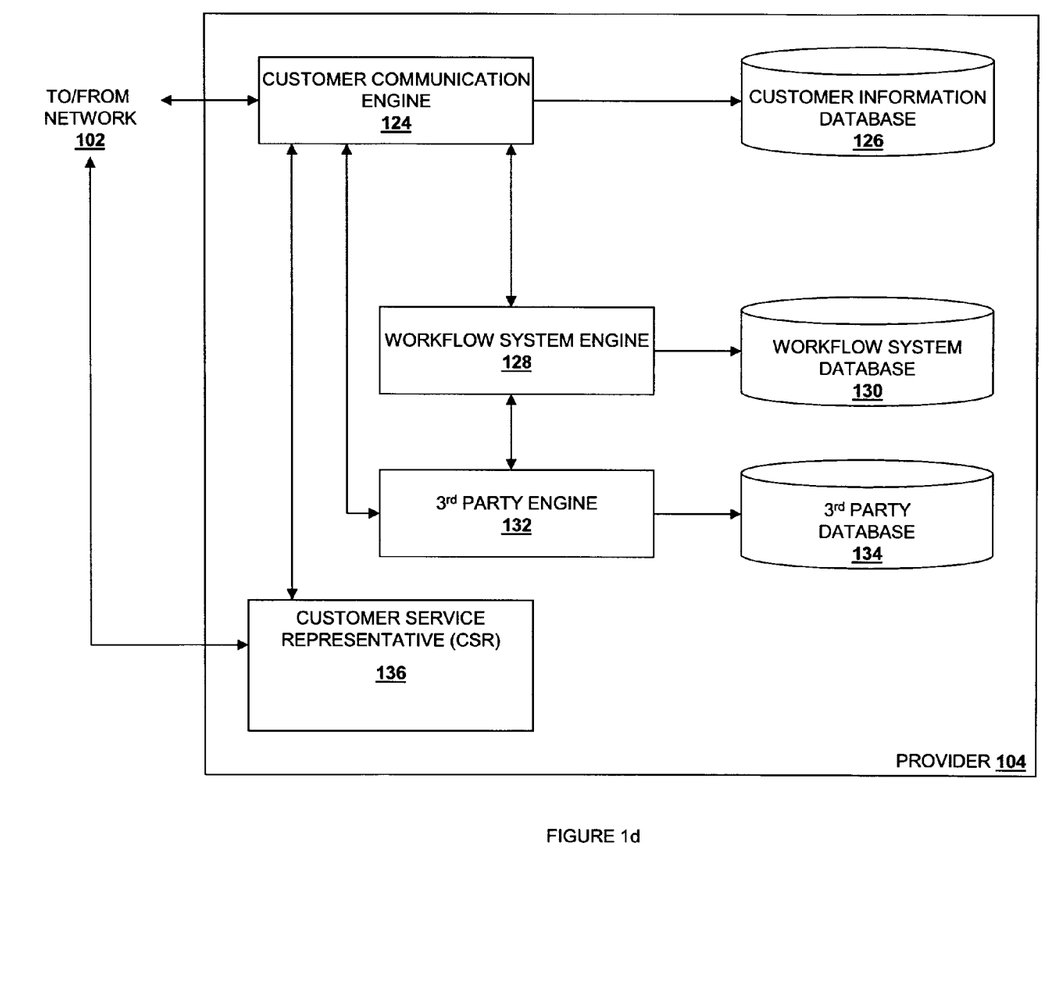

Referring now to FIG. 1d, in an embodiment, the provider 104 is substantially as is described above, but with the provision of a customer service representative (CSR) 136 that may be an agent or other representative of the provider 104. The CSR 136 is operably coupled to the network 102, the customer communication engine 124, and through the customer communication engine 124 to the engines 128 and 132 and the databases 126, 130, and 134. The CSR 136 may be a person or combination of people that interact with the customers of the provider 104. In addition, the CSR 136 may include a computerized avatar using artificial intelligence to interact with customers 106, 108, and 110 of the provider 104. In an embodiment, the computerized avatar CSR 136 may be incorporated into the customer communication engine 124.

Referring now to FIGS. 1a, 1b, 1c, 1d and 2, a method 200 to transfer a document is illustrated. For clarity of discussion, the method 200 will be described in an embodiment of transferring a document for use in an insurance claim. However, one of ordinary skill in the art will readily understand that the method 200 may be used any time a document is to be received from a third party for any type of transaction such as, for example, a banking transaction, a sales transaction, a mortgage or loan transaction, or a variety of other transactions.

Figure 2:
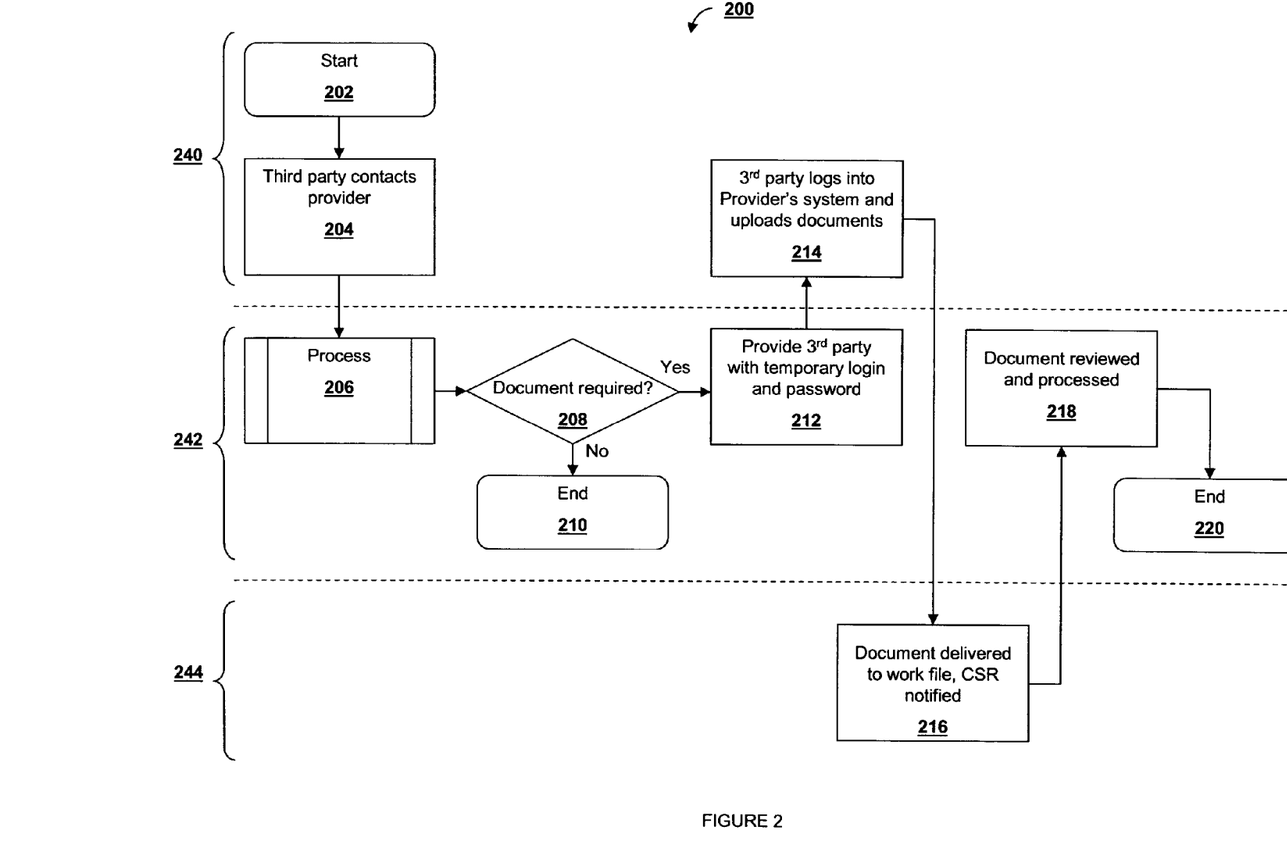
FIG. 2 is a flow chart illustrating an embodiment of a method to transfer a document.

The method 200 begins at block 202 where the third party 107, such as, for example, an automobile repair shop, needs to transfer a document such as, for example, an invoice for payment for a repair of a damaged automobile, to the provider 104 (e.g., an automobile insurance provider). The method 200 proceeds to block 204 where the third party 107 contacts the provider 104, for example, to inform the provider 104 of a completed repair job on an automobile and to request payment from the provider 104. The method 200 then proceeds to block 206 where the provider 104 initiates a workflow process to plan, monitor, and move the transaction through the provider 104 to complete the transaction. In an embodiment, a workflow process is a system of procedures for processing the transaction through the provider 104. An embodiment of a procedure of a workflow process includes assigning a unique transaction identifier to each transaction as a reference to use while processing the transaction. Upon initiating the workflow process, the method 200 then proceeds to decision block 208 where the third party engine 132 accesses the third party database 134 to determine whether a document is required from the third party 107 to complete the transaction. In an embodiment, the third party engine 132 may use factors stored in the third party database 134 to determine if the document is required and/or if the document will be accepted by the provider 104. In an embodiment, such factors include for example, whether the provider 104 transacts business with the third party, whether the customer 106 (for whom the transaction relates to) is a member of the provider's 104 membership organization, whether the document to be transferred is needed for the present transaction, and a variety of other factors. If no document is required, the method 200 ends at block 210. However, if a document is needed to further the transaction, the method 200 proceeds to block 212 where the provider 104 provides the third party 107 a temporary login name, password, and/or other temporary means to gain access to a secure system using, for example, an Internet website provided by the customer communication engine 124.

In an embodiment, the provider 104 may require a document from the third party 107 when, for example, an itemized invoice of the repairs to an automobile is needed so that the provider 104 may make the payment to the third party 107. However, any type of document may be uploaded to the provider 104 such as, for example, a total loss settlement statement notifying an insured that the item(s) insured are a total loss and including a respective settlement payment, a power of attorney form appointing the provider power to act as attorney the signor, an odometer disclosure statement disclosing a vehicle's actual mileage, a salvage retention affidavit disclosing that a vehicle has been a total loss and is being retained without insurance coverage, a proof of loss statement form to inform an insurer of a loss claim, a diminution in value statement disclosing a diminution in value for an insured item, a medical expenses statement detailing the cost associated with a medical procedure, an attending physician's/dentist's report, a medical report, an authorization for disclosure of medical information form allowing a holder of the medical information to release the information to others, a wage and salary verification form, and/or a variety of other forms known in the art.

Once the temporary login and/or password are supplied to the third party 107, the method proceeds to block 214 where the third party 107 may use the temporary password and/or login name to login to the secure system through the Internet website, associate the document to a given transaction, and upload an electronic copy of the document to the secure system. In an embodiment, the workflow system engine 128 assigns a transaction identifier such as, for example, a name or number to an insurance claim for the customer 106 that resulted from an automobile accident. The transaction identifier may be stored in the customer information database 126 to associate the transaction with the customer 106, in the workflow system database 130 to allow the workflow system engine 128 to track the progress of the transaction through the provider 104, and/or in the third party database 134 to allow the third party to associate a document with the transaction. An embodiment of the third party login and document transferring process of block 214 is described in more detail below. In an embodiment, the third party 107 may upload any number of documents. The method 200 then proceeds to block 216 where the uploaded document, either in electronic (soft copy) form or in paper (hard copy) form, are routed to a customer service representative (CSR) 136 for processing via the customer communication engine 124, the workflow system engine 128 and/or the third party engine 132. The method 200 then proceeds to block 218 where the CSR 136 uses the uploaded document in the processing of the transaction (e.g., the insurance claim). After the document is reviewed and processed by the CSR 136 at block 218, the method 200 ends at block 220.

In an embodiment, the method 200 may be performed by multiple parties or systems. For example, the bracket 240 indicates that blocks 202, 204, and 214 may be performed by the third party 107, the bracket 242 indicates that blocks 206, 208, 210, 212, 218, and 220 may be performed by a CSR 136, and the bracket 244 indicates that block 216 may be performed by an automated or manual workflow system that routes and tracks the transaction through an organization, increasing reliability and decreasing time required to process the transaction (e.g. the insurance claim). It is noted that the blocks of method 200 may be re-arranged from the configuration shown in FIG. 2, while the function of the method 200 remains substantially the same by enabling the third party 107 to upload an electronic copy of a document to a provider 104.

Referring now to FIGS. 1a, 1b, 1c, 2, and 3, a method 300 of a third party document transferring procedure is illustrated. The method 300 starts at block 302 where the third party 107 begins the document transferring procedures. The method 300 then proceeds to block 304 where the third party 107 saves the document to, for example, a computer readable medium 122 located on an IHS 112. The document may be created on a text editor, word processor, spreadsheet, or a variety of other software packages. In addition, the document may be received by the third party 107 from an outside source such as, for example, from the provider 104 and/or the customer 106. In such an embodiment, the third party 107 may modify the received document such as by filling in blank spaces in the document. The third party 107 may then save the electronic document to the computer readable medium 122 for later transfer. In an embodiment, the third party may have a hard copy or paper copy of the document and may optically scan or otherwise digitize that copy of the document to convert the copy of the document into electronic form such that the document may be saved to the computer readable medium 122. In an embodiment, the digitized copy of the document may be in a portable document file (PDF) format, joint photographic experts group (JPG) format, bitmap format, tagged image file format (TIFF), and/or a variety of other formats known in the art. Once the third party saves the document to a computer readable medium 122, the method 300 proceeds to block 306 where the third party uses the temporary login name and/or password given to the third party 107 in block 212 of method 200 to login to a provider's secure system or other IHS 112 via, for example, an Internet website. Once the third party 107 logs into the provider's secure system or IHS 112, the method 300 proceeds to block 308 where the third party 107 finds and selects a transaction identifier relating to the transaction (e.g., the insurance claim) among a list of multiple transaction identifiers on the provider's secure system or IHS 112 to associate the document with upon transfer. In an embodiment, the third party 107 uses the network 102, the customer communication engine 124, and/or the third party engine 132 to complete transfer process of the method 300. It is to be understood that the third party 107 may be given a login name, password, and/or other means to allow the third party 107 to directly access the transaction on the secure system or IHS 112. In such an embodiment, there may be no need for the third party 107 to select a transaction identifier.

Figure 3:
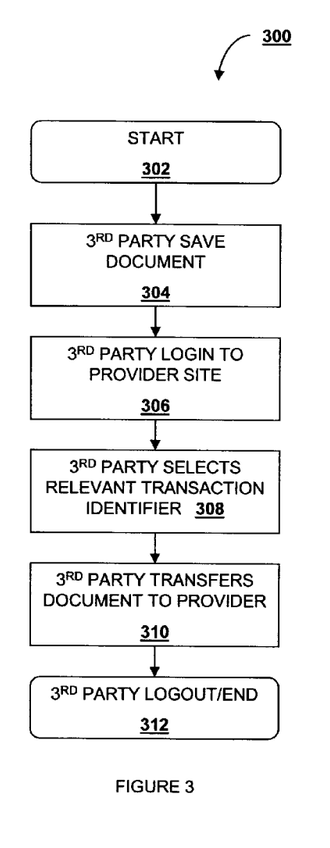
FIG. 3 is a flow chart illustrating third party steps in an embodiment of a method to transfer a document.
Figure 4:
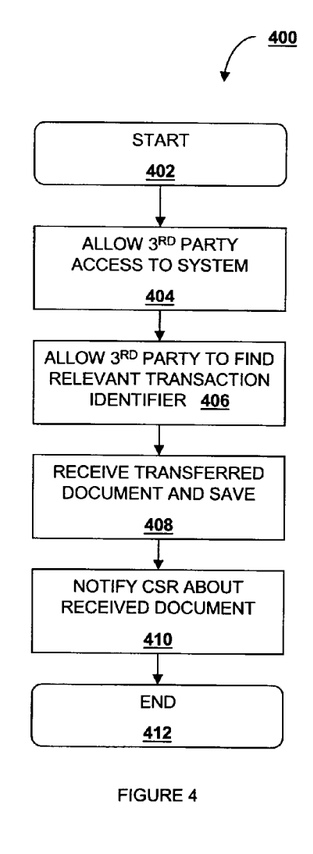
FIG. 4 is a flow chart illustrating provider steps in an embodiment of a method to transfer a document.

The method 300 then proceeds to block 310 where the third party 107 uploads the electronic copy of the document by transferring the electronic file comprising a copy of the document via the network 102 to a computer readable medium 122 that is accessible by the provider 104 such as, for example, the third party database 134 or the workflow system database 130, described above with reference to block 214 of method 200. Any system may be used to transfer the electronic copy of the document to the third party database 134 such as, for example, a web-based transfer system described in further detail below. In an embodiment, the electronic file and the transaction are saved on a common database. After the electronic file comprising the copy of the document is received by the provider's 104 system, the third party may be allowed to upload more documents or other electronic files to the provider 104. In addition, after uploading the document, the third party 107 may be able to access the same or a related secure system or IHS, via an Internet website, in order to track the status of the transaction. In an embodiment, the provider 104 may provide information to the third party 107 to assist in completing the transaction such as, for example, contacting the third party 107 to request payment information such as bank account routing information for the third party 107 such that the third party 107 may receive a direct deposit payment for services rendered in the transaction. Next, the method 300 proceeds to block 312 where the third party 107 logs off the secure system or otherwise ends the document transferring procedures.

Referring now to FIGS. 1a, 1b, 1c, 2, 3, and 4, a method 400 to allow a third party to transfer an electronic copy of a document to a provider 104 is illustrated. The method 400 begins at block 402 where the provider 104 may issue a login name, password, or other security device to the third party 107 to access a secure system or IHS 112. The method 400 then proceeds to block 404 where the provider 104 allows the third party 107 access to the provider's 104 secure system as described above with reference to blocks 212 and 214 as exemplified in method 200. The method 400 then proceeds to block 406 where the third party 107 is allowed access to the secure system of the provider 104 to find and select a transaction identifier with which the document is to be associated with once the document is received by the provider 104. As noted above with reference to block 308, the third party 107 may not need to select a transaction identifier if the access allowing the third party 107 to upload the document directs the third party 107 directly to the transaction on the secure system that the document is to be associated with. The method 400 then proceeds to block 408 where the provider 104 receives the electronic file comprising the electronic copy of the document from the third party 107 and saves the file to the customer information database 126, the workflow system database 130, and/or the third party database 134, thus allowing the file to be accessed by the provider 104 or the CSR 136 during the transaction processing method 200. In an embodiment, the method 400 then proceeds to block 410 where a CSR 136 is notified about the received document, as described with reference to block 216 of method 200, so that the CSR 136 may use the document to process the transaction (e.g., the insurance claim) in method 200. It is to be understood that notifying the CSR 136 may be performed manually by having a representative of the provider 104 print out the copy of the document using for example, the print device 120, and then providing the printed copy of the document to the CSR 136. Notifying the CSR 136 may also be automatically performed by the workflow system engine 128 sending notification, such as an email, to the CSR 136 including the electronic file comprising the electronic copy of the document or by notifying the CSR 136 that the CSR 136 may access an electronic file of the document using the customer communication engine 124, the workflow system engine 128, and/or the third party engine 132. The method 400 then ends at block 412 and the CSR 136 may use the uploaded document to process transaction (e.g., the insurance claim) as in method 200.

Referring now to FIGS. 1a, 1b, 1c, 2, 3, 4, and 5a, an embodiment of an Internet website including a Provider Home page 500 is illustrated. The Provider Home page 500 allows a third party 107 to login to the provider's secure system and use the customer communication engine 124, the workflow system engine, and/or the third party engine 132, via the network 102, to upload an electronic file comprising an electronic copy of a document to the provider 104. The provider Home page 500 may have one or more web page links 502 for allowing a user of the Home page to have quick access to other Internet web pages. Web page Links 502 may include links such as, for example, an Organization Products link 504, an Organization Services link 506, an Organization News line 508, a Popular Sites link 510, a Provider Partners link 512, and/or and Online Help link 514. It is understood to those having ordinary skill in the art that any variety of links 510, text, images, or other web page features may be included on the Provider Home page 500.

Figure 5A:
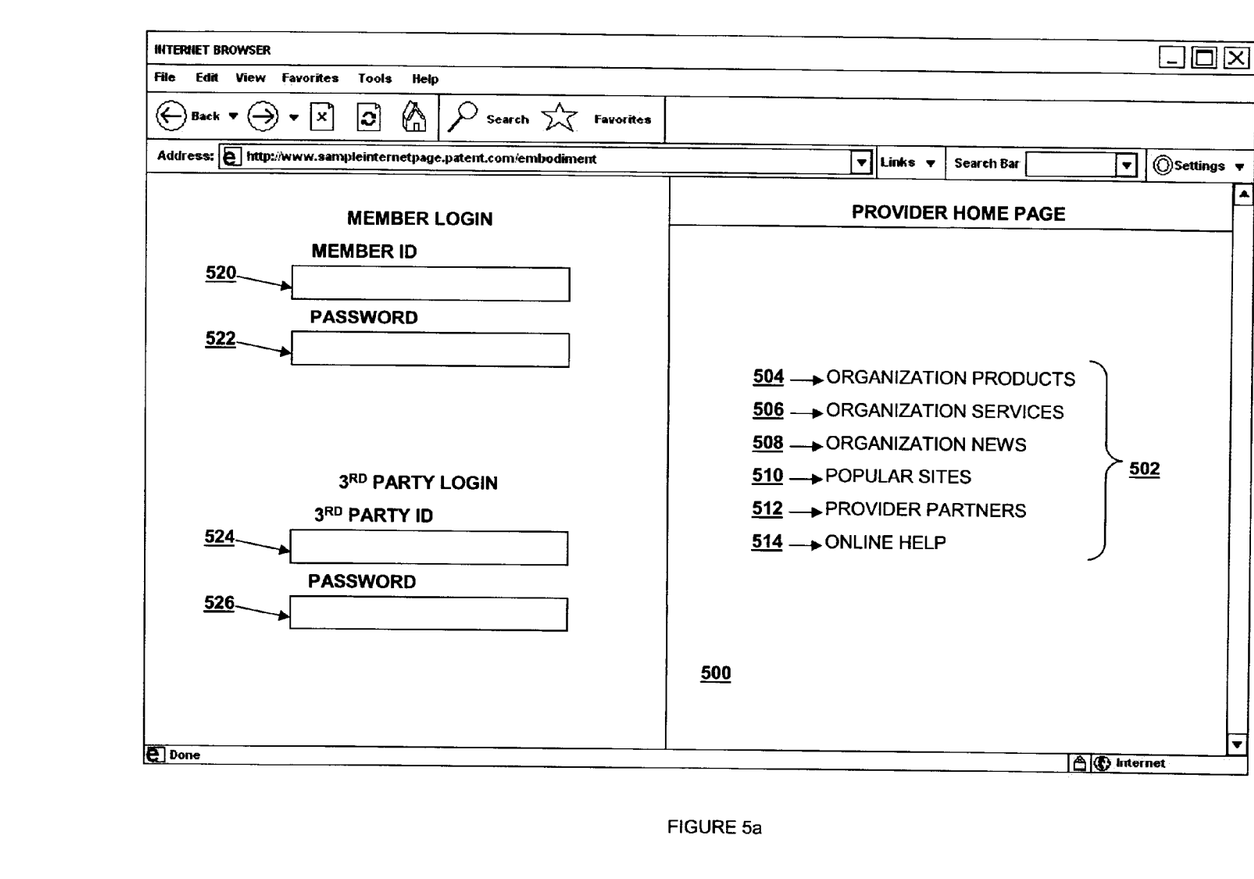
FIG. 5a is a screen shot illustrating an embodiment of a Provider Home page.
Figure 5B:
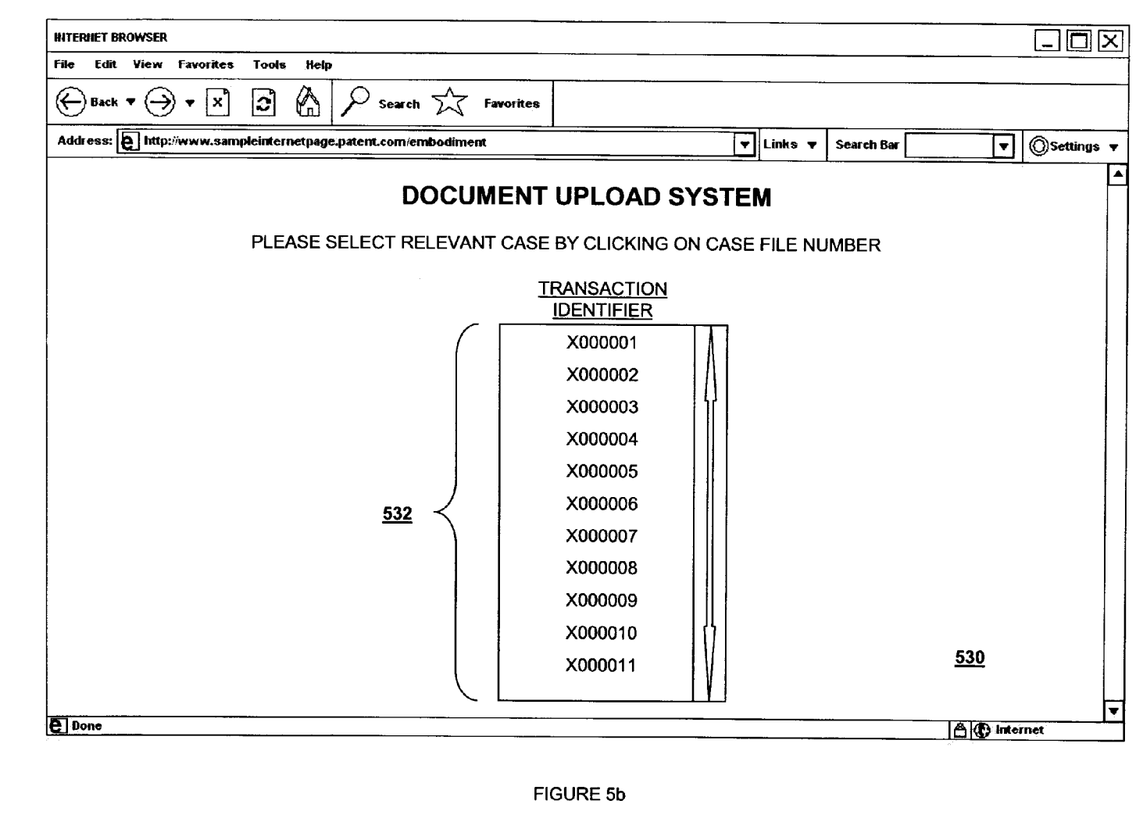
FIG. 5b is a screen shot illustrating an embodiment of a Transaction Selection page.
Figure 5C:
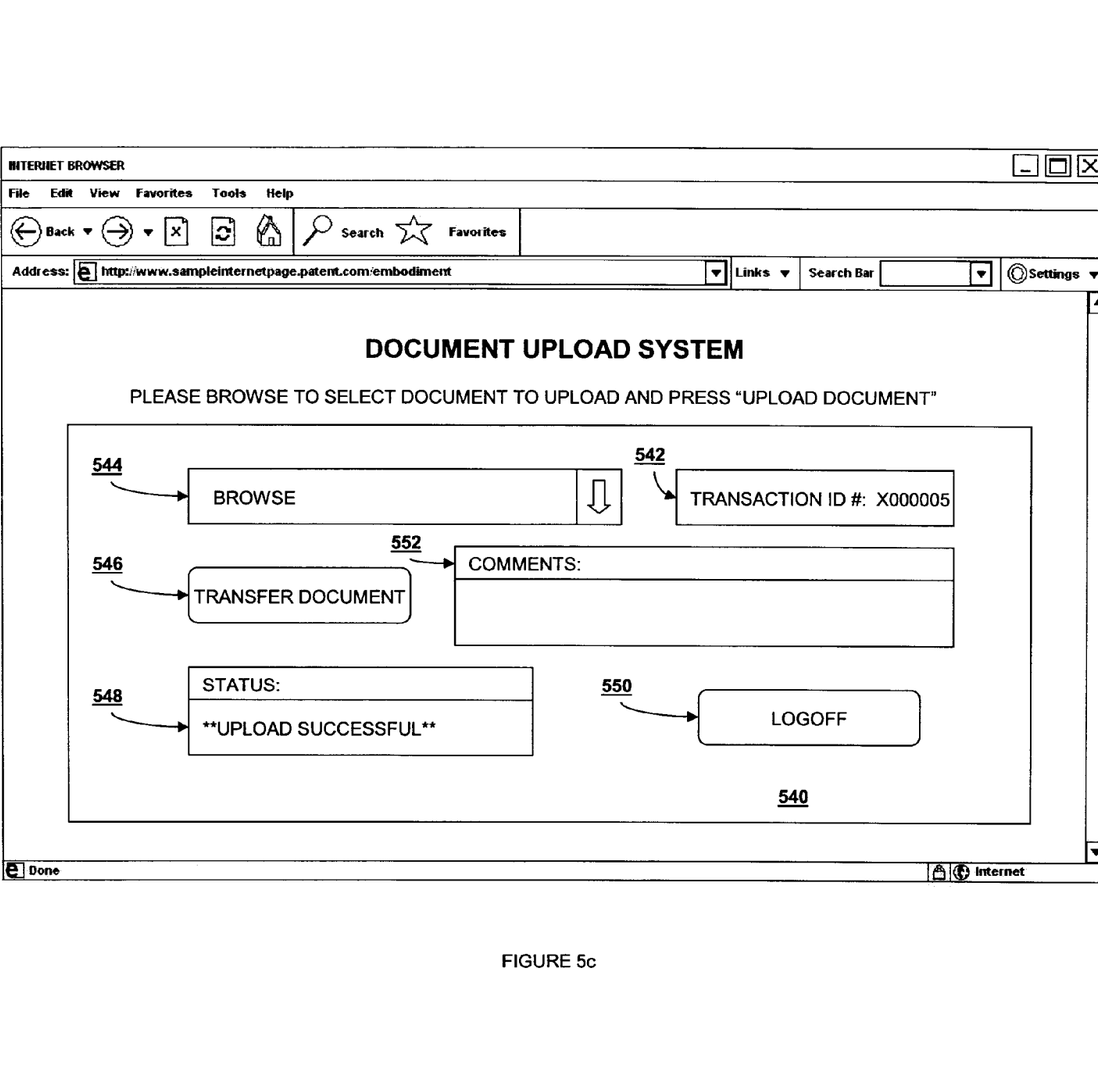
FIG. 5c is a screen shot illustrating an embodiment of a Document Upload page.

In an embodiment, the Provider Home page 500 may include a Member ID 520 field and a Member Password field 522 for allowing, for example, members of the provider's membership organization to securely access a members-only portion on the Provider's Internet website. In an embodiment, a member for the provider 104 may be the customer 106, 108, and/or 110. However, if the provider 104 requests a document from a third party who is not a member of the membership organization, the third party 107 may be supplied a temporary login name and/or password for temporary access to the secured system to upload the document or documents needed by the provider 104 to process the transaction as described above. In such an embodiment the Home page 500 may include a Third Party Login field 524 and/or a Third Party Password field 526 to allow the third party 107 to enter a temporary login name and/or a temporary password supplied from the provider 104 by, for example, a prior email message or a prior telephone conversation, to gain access to the secure system of the provider 104. In an embodiment a secure system of the provider 104 may be for example, the third party engine 132.

Referring now to FIGS. 1a, 1b, 1c, 2, 3, 4, 5a, and 5b, an embodiment of an Internet website including a Transaction Selection page 530 is illustrated. The Transaction Selection page 530 may be displayed on an IHS 112 of the third party 107 after the third party 107 logs in to the secure system using the Provider Home page 500 and selects a relevant transaction identifier from a list of available transaction identifiers 532. In an embodiment, the third party 107 may scroll through the list of available transaction identifiers 532 and find the transaction identifier with which the third party 107 wants to associate the document upon transfer. Once the relevant transaction identifier is found and selected from the list of available transaction identifiers 532, the third party engine 132 may transfer the third party 107 to a webpage on the Internet website for uploading documents to the provider 104.

Referring now to FIGS. 1a, 1b, 1c, 2, 3, 4, 5a, 5b, and 5c, an Internet website including a Document Upload page 540 is illustrated. In an embodiment, the Document Upload page 540 includes a Case File field 542, a File Search field 544, an Upload Document button 546, an Upload Status field 548, a Comments field 552, and/or a Logoff button 550. In an embodiment, the Case File field 542 displays the selected transaction identifier selected in the list of available transaction identifiers 532 on the Transaction Selection page 530. This allows the third party 104 to verify that the transaction identifier for which the document is to be associated upon transfer is correct. If the third party notices that the Case file field 542 is displaying the incorrect transaction identifier, the third party 107 may return to the Transaction Selection page 530 to select the correct transaction identifier. The File Search field 544 allows the third party 107 to browse through a set of files, for example, on a computer readable medium 122 located on an IHS 112 of the third party 107 to find the electronic file containing the document to be uploaded, as described with reference to blocks 214 and 310. Once the desired electronic file is found, the third party 107 may select the file and the file path and file name may be displayed in the File Search field 544. The third party 107 may enter a text comment in the Comments field 552 to supply the provider 104 or CSR 136 with additional information. In an embodiment, the third party 107 may select the Upload Document button 546 and the third party engine 132 may communicate with the IHS 112 used by the third party 107 to transfer the electronic file and any entered comments from the IHS 112 of the third party 107 to the third party database 134 of the provider 104, as described with reference to block 408. After the third party 107 selects the Upload Document button 546, the Status field 548 may display the status of the upload. If the upload procedure was successful, the term "Upload Successful" may appear in the Status field 548. However, if the upload was not successful, or other issues arise with the upload, other messages may be displayed in the Status field 548 and the third party 107 may try again to upload the document. After the third party 107 has successfully uploaded the document, the third party 107 may select the Logoff button 550 to end the upload procedure as described with reference to block 312. The workflow system engine 128 may then automatically transfer the received electronic file and/or the copy of the document to the CSR 136, as described with reference to block 216. Thus, the document needed by the CSR 136 may be transferred to the provider in a much shorter time relative to conventional methods. As a result, in the case of a auto body repair shop, for example, a repair shop may receive payment from the provider 104 in a shorter time relative to conventional methods.

It is to be understood that, while the above was described in reference to uploading a document for an insurance claim, the system and method may be used for any type of transaction needing a document from a third party, such as, for example, to upload any insurance, banking, financial, business or other document. Thus a system and method are provided that include faster transaction processes, ability to close and open accounts or business deals sooner, fewer people handling the document resulting in less chance of error or loss, provide an electronic record of the transaction such as, for example, associating an electronic time and date stamp with the transferred document as is commonly understood in the art, and reduce overall paper-based mail. It is also to be understood that the system and method may allow the third party 107 access to an Internet website to allow the third party 107 to track progress of the transaction. In an embodiment, links on the Internet website of the provider 104 are provided to the third party 107 that include the CSR's 136 email address, telephone number, fax number and a variety of other resources such as live chat, or click to call back, such that the third party is provided easy access to the CSR 136 to further simplify the transaction and speed up the process. Internet links 502 such as, for example, links, telephone numbers, and/or address of the nearest repair shops that the provider 104 uses for repairs may also be provided to the customer 106 and/or the third party 107 to help facilitate the transaction. A variety of other links, while not shown, may be provided to assist the transaction. In an embodiment, the CSR 136 may remotely control operation of an IHS 112 of the third party 107 via the network 102 to assist the third party 107 with the transferring process or to perform the scanning of the document and/or transferring the document. Remote control and/or operation of an IHS 112 may be conducted using the customer communication engine 124, the workflow system engine 128, and/or the third party engine 132.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system to process an insurance claim, the system comprising:
    a computing device of an information handling system of a provider, the computing device having a number of processors associated with a number of memories in various subsystems, wherein the memories include executable instructions executed on one or more of the processors to:
    receive an insurance claim from an insured customer;
    communicate with a third party regarding the insurance claim, wherein the third party is a person other than the insured customer;
    determine that a document is required from the third party to process the insurance claim;
    provide temporary credentials to the third party via an electronic mail message or a telephone conversation;
    provide the third party access to a secure system using the temporary credentials via the third party entering the temporary credentials as a log-in to the secure system in order to transfer an electronic version of the document to a computer readable medium of the information handling system of the provider using a website;
    receive the electronic version of the document from the third party, wherein the third party selects a transaction identifier uniquely associated with the insurance claim for the insured customer from a list of transaction identifiers and associates the transaction identifier with the electronic version of the document, and wherein the transaction identifier identifies the insurance claim;
    use the transaction identifier to identify the insurance claim; and
    use the document to process the insurance claim.

2. The system of claim 1, wherein the third party is a creditor for the claim.

3. The system of claim 1, wherein the third party is a debtor for the claim.

4. The system of claim 1, wherein to provide the temporary credentials to the third party comprises a temporary password is provided to the third party to access the secure system to transfer the electronic version of the document.

5. The system of claim 1, wherein the document is scanned to create the electronic version of the document.

6. The system of claim 1, further comprising at least one subsystem to:
    automatically route the document to a customer service representative for processing of the insurance claim.

7. A computer-readable medium comprising computer-readable instructions to process an insurance claim, said computer-readable instructions comprising instructions executed on a number of processors to:
    receive an insurance claim from an insured customer;
    communicate with a third party regarding the insurance claim, wherein the third party is a person other than the insured customer;
    determine that a document is required from the third party to process the insurance claim;
    provide temporary credentials to the third party via an electronic mail message or a telephone conversation;
    provide the third party access to a secure system using the temporary credentials via the third party entering the temporary credentials as a log-in to the secure system in order to transfer an electronic version of the document to a second computer readable medium using a website;
    receive the electronic version of the document from the third party wherein the third party selects a transaction identifier uniquely associated with the insurance claim for the insured customer from a list of transaction identifiers and associates the transaction identifier with the electronic version of the document, and wherein the transaction identifier identifies the insurance claim;
    use the transaction identifier to identify the insurance claim; and
    use the document to process the insurance claim.

8. The computer-readable medium of claim 7, wherein the third party is a creditor for the claim.

9. The computer-readable medium of claim 7, wherein the third party is a debtor for the claim.

10. The computer-readable medium of claim 7, wherein to provide the temporary credentials to the third party comprises a temporary password is provided to the third party to access the secure system to transfer the electronic version of the document.

11. The computer-readable medium of claim 7, wherein the document is scanned to create the electronic version of the document.

12. The computer-readable medium of claim 7, further comprising computer-readable instructions to:
    automatically route the document to a customer service representative for processing of the insurance claim.

13. A method to process an insurance claim, the method comprising:
    utilizing a computer-readable medium having stored thereon computer-executable instructions executable on a number of processors to perform a number of steps that include:
    receiving an insurance claim from an insured customer;
    communicating with a third party regarding the insurance claim, wherein the third party is a person other than the insured customer;
    determining that a document is required from the third party to process the insurance claim;
    providing temporary credentials to the third party via an electronic mail message or a telephone conversation;
    providing the third party access to a secure system using the temporary credentials via the third party entering the temporary credentials as a log-in to the secure system in order to transfer an electronic version of the document to a second computer readable medium using a website;
    receiving the electronic version of the document from the third party, wherein the third party selects a transaction identifier uniquely associated with the insurance claim for the insured customer from a list of transaction identifiers and associates the transaction identifier with the electronic version of the document, and wherein the transaction identifier identifies the insurance claim;
    using the transaction identifier to identify the insurance claim; and
    using the document to process the insurance claim.

14. The method of claim 13, wherein the third party is a creditor for the claim.

15. The method of claim 13, wherein the third party is a debtor for the claim.

16. The method of claim 13, wherein providing the temporary credentials to the third party comprises a temporary password is provided to the third party to access the secure system to transfer the electronic version of the document.

17. The method of claim 13, wherein the document is scanned to create the electronic version of the document.

18. The method of claim 13, further comprising:
   automatically routing the document to a customer service representative for processing of the insurance claim.

* * * * *